United States Patent Office 3,720,501
Patented Mar. 13, 1973

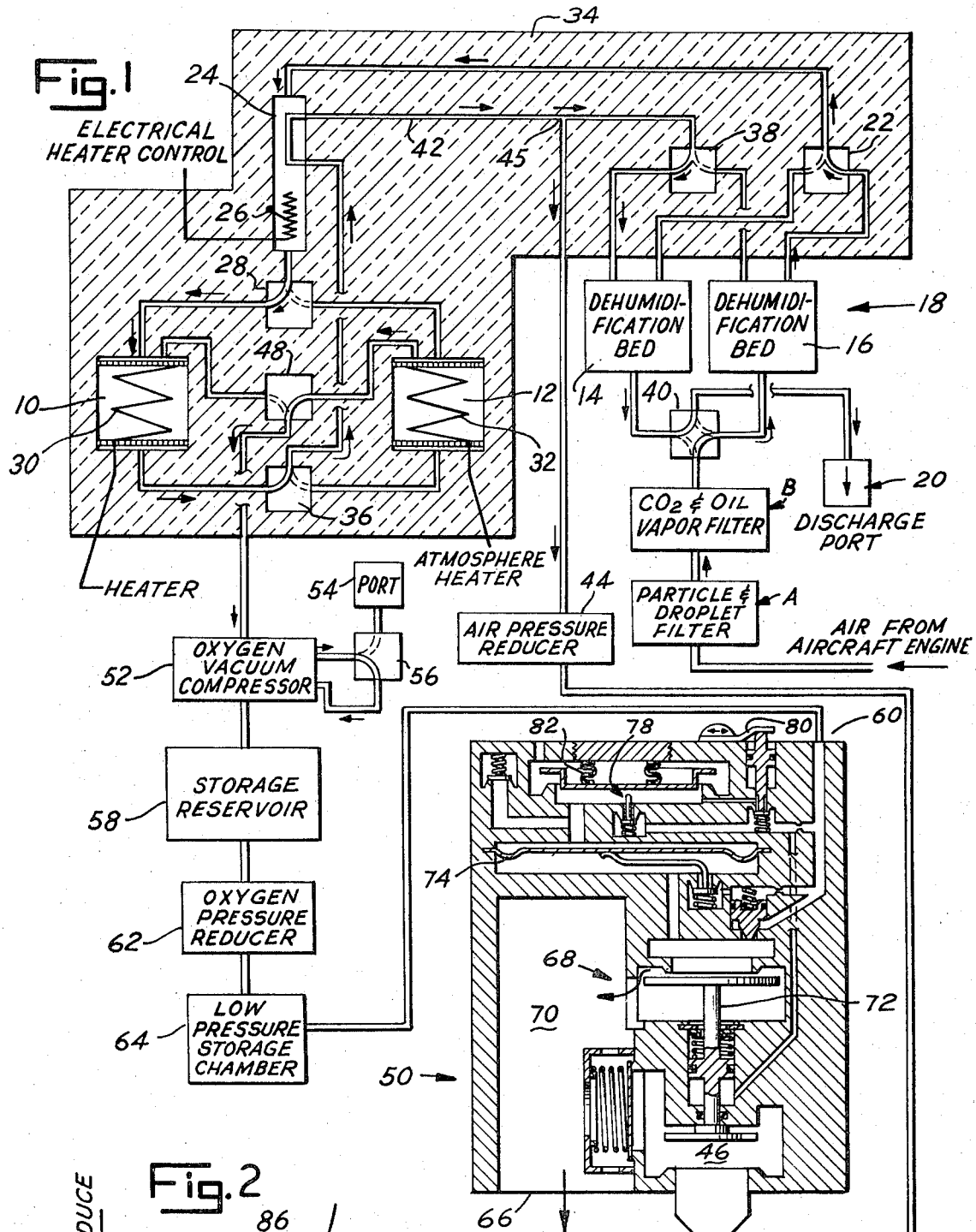
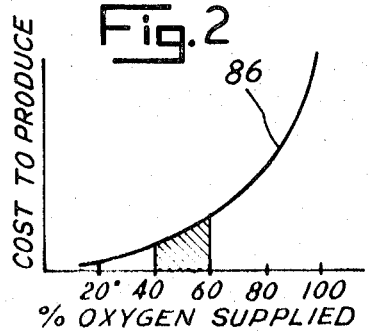

3,720,501
SYSTEM FOR ENRICHING INHALABLE AIR WITH OXYGEN
Robert L. Cramer and John W. Henneman, Davenport, Iowa, assignors to The Bendix Corporation
Filed Nov. 2, 1970, Ser. No. 86,240
Int. Cl. B64d 13/08; B01j 7/00
U.S. Cl. 23—281                                    6 Claims

ABSTRACT OF THE DISCLOSURE

A system for providing oxygen enriched air to a recipient. Contaminants carried by air from an external source are removed by a filter member. This filtered air is transported to a humidification chamber where the water vapor is reduced to a desired amount. The temperature of the air and crystals of barium oxide are simultaneously riased to a desired temperature. This heated air is then pressurized and brought into contact with the barium oxide where some of the air will react with the barium oxide to form barium peroxide. The unreacted air and nitrogen given up by the reaction is returned by a conduit to the humidification chamber where excess water vapor is picked up and returned to the atmosphere. After a predetermined time, communication of the pressurized air with the barium oxide is prevented and the pressure around the barium peroxide is reduced by a vacuum. When the pressure has been reduced sufficiently, the barium peroxide will revert to barium oxide by releasing oxygen. The released oxygen is condensed and stored in a reservoir. A dilution regulator has one inlet port connected to the conduit carrying the unreacted air and nitrogen and a second inlet port conected to the oxygen reservoir. A valve member located in the dilution regulator, which is responsive to a change in altitude, will proportion the oxygen with the unreacted air to maintain the physiological level for the recipient.

BACKGROUND OF THE INVENTION

In prior art aircraft breathing systems, it is known to take 100% oxygen and dilute it with air from the cabin before delivering it to the crew members. In any situation where the cabin air has become contaminated due to smoke, fuel or any other undesirable odor, it is necessary for 100% oxygen to be supplied to the crew members. After a certain length of time of breathing 100% oxygen, a toxicity will occur to the user. In addition, an increased hazard of fire will be present when 100% oxygen is supplied, and the reservoir which holds the oxygen must be sufficiently large for at least several hours of continued use, particularly, in military operations.

In the prior art, it is known that barium oxide will absorb oxygen at a high temperature and then release the same oxygen when the pressure is varied by pulling a vacuum across it, commonly known as a Brin process. The oxygen purity obtained by this process will be between 97% to 98% pure. The success of the Brin process for producing oxygen has been attributed to the purification of the air prior to use, the reduction in the operating temperature, and the preparation of the porous barium oxide. But, the cost of producing 100% oxygen to be supplied and mixed in the reservoir is prohibitive in relation to the weight and size of the container needed for continued use.

It has been observed that the physiological requirement of oxygen for an individual is about 40% oxygen up to an elevation of 25,000 ft. Because of this, it is proposed by our system that the volume of oxygen supplied be less than 100% so that the size of the container used in making oxygen can be reduced.

SUMMARY OF THE INVENTION

Through our invention we have devised a method for providing a recipient with oxygen mixed with air to maintain his desired physiological level up to 25,000 ft. This is well above the cabin altitudes encountered, except in rare decompression situations. Air from the aircraft outside the cabin is bled to a filter means which will remove any solid contaminants and odors. This air is then passed to a dehydration means whereby the water vapor contained in the air is reduced to a desired level. This dry air is then passed through a heater mechanism where the temperature is raised from 1200° F. to 1400° F. This air under pressure is then passed to a bed of barium oxide which has been simultaneously heated from 1200° F. to 1400° F. Valve means will then be opened to permit this heated air to pass through an opening to the barium oxide under pressure. Some of this air will react with the barium oxide and form barium peroxide. As a result nitrogen will be released. Unreacted air and nitrogen will be routed through a conduit to the dehydration means where excess water vapor is picked up from the dehydration means and transferred to the atmosphere thereby regenerating the dehydration means. After a predetermined length of time, the pressurized air is stopped and a vacuum is drawn across the barium peroxide. The vacuum will reduce the pressure around the barium peroxide crystals and as a result, the barium peroxide will revert back to barium oxide with oxygen being released. The released oxygen is then compressed and stored in a reservoir. The conduit carrying the unreacted air and nitrogen is simultaneously diverted by a splitter to the control means and the dehumidifier means. The control means has an inlet port connected to the oxygen reservoir. Valve means within the control means will proportion the unreacted air and nitrogen with the oxygen to a demand regulation valve to supply a recipient with a desired mixture of air and oxygen up to a certain elevation. The valve mechanism is responsive to a change in altitude to maintain a desired proportion until a predetermined elevation is reached which will stop the unreacted air and nitrogen flow from the conduit mechanism and supply 100% oxygen from the reservoir to the recipient.

It is therefore an object of the invention to provide a system whereby purified enriched air is supplied to a recipient upon demand.

It is another object of the invention to provide unreacted air to a recipient which is clinically clean after it passes through a bed of barium oxide.

It is another object of the invention to provide an open loop breathing system with a self-contained dilution oxygen generation extractor.

These and other objects of the invention will become readily apparent to those who read the specification and view the drawings.

BRIEF DESCRIPTION OF THE DRAWINGS

FIG. 1 is a flow schematic of an open loop breathing system for providing a recipient with oxygen enriched air in accordance with the invention.

FIG. 2 is a chart plotting the relative cost against the percentage of oxygen produced for the system in accordance with the principles of my invention.

DETAILED DESCRIPTION OF THE PREFERRED EMBODIMENT

As shown in FIG. 1, pressurized air from an aircraft engine, not shown, enter the breathing system through a first filter mechanism A. This bleed air from a jet engine may contain as much as three parts per million of engine oil, as well as salt spray, sand, dust and even exhaust gases from other engines. These contaminants must be removed prior to the introduction of the compressed gas to the system. The high pressure air stream is first passed through a first micron prefilter of mechanism A which will eliminate small particle matters such as salt, sand and dust. The air is then passed through an automatic drain mechanical separator or droplet filter included in mechanism A which will further reduce particle matter down to as much as 3 microns in size. Both the prefilter particle device and the droplet filter are known and as such the exact details are not considered part of this invention. In addition, it will also remove almost all of the water and aerosol which have been entrained in the air stream. Through this preconditioning, essentially all the salts and entrenched oil and gases are removed.

It is essential that these contaminants be removed in filter A to prevent unwanted reactions with the oxygen producing barium oxide crystals retained in either beds 10 and 12, later in the system, since contaminants such as hydrogen sulfide, oil and water of hydration effect the efficiency of the regeneration of the barium oxide system. The above constituents at the operating temperature will react with either barium oxide or barium peroxide in the following undesired manner. Excessive water and carbon dioxide will form barium hydroxide or barium carbonate thus eliminating the effectiveness of the barium oxide in the generation system. On the other hand, oil entering into the heated bed would ignite, thereby forming carbon dioxide and water which also would bring an unwanted gas in the breathing system. Therefore, it is necessary that the air stream be essentially stripped of contaminants prior to being introduced into the barium oxide beds, through the filtering mechanisms in order that the barium oxide generation system will produce oxygen through the regeneration cycling process for many cycles without undue deterioration.

From the first filter mechanism A the air is then passed through a carbon dioxide absorber B which will remove the remaining oil vapor and other organic vapors. Deactivated charcoal contained in absorber B serves a dual purpose of purifying the air stream by removing odors and other irritating vapors. Carbon dioxide is then removed by passing the air through a lithium hydroxide canister, of a known type contained in absorber B. From this canister the air is passed through a dehydration chamber having a series of Linde Molecular Sieve beads where excessive water vapor will be removed from the air.

It is essential that the water vapor of the air which reaches the barium oxide be maintained in a relative dry condition. The continuous recycling capabilities and activities of the barium oxide and peroxide is maintained at a high level only when a small amount of water is present in the processed air stream. The small amount of water has been shown to be extremely beneficial as a catalyst to carry out the oxygen absorption and desorption process. Excessive moisture on the other hand has an unwanted effect by causing disintegration of the solid solution. This requirement of only a trace of moisture necessitates removal of excess water vapor from the incoming saturated air stream to a dew point of 0° F. or lower to maintain the system efficiently throughout the operational period. Dehumidification of the pressurized air stream must be accomplished by a self-regenerating type dehydration stream whereby replacement or consumption of the absorbant will not be required during at least a predetermined number of hours of operation. Regeneration-dehydration systems, of course, are available, but usually require either to replace materials or excessive power or special equipment for cyclic operation. It is for this reason that a self-regeneration-dehumidification means is provided to remove the excess water vapor from the dehumidifier as a secondary operation of our breathing system. Either bed 14 or bed 16 of the dehydration mechanism 18 will be regenerated by warm air from either bed 10 or bed 12 of the barium oxide reaction chamber which will pick up the excess water in the sieves and return it to the atmosphere through discharge port 20. From either of the dehydration sieves 14 and 16, the air is ported through a two-way valve 22 to an air-air heat exchanger 24. In this air-air heat exchanger the warm, dry incoming air is heated by the hot air exiting from either barium oxide-hydroxide bed 10 or 12. The air then passed over the electrical heating elements 26 to have its temperature raised to the level required for a reactionary level with barium oxide-barium peroxide. From the heat exchanger 24 the air is ported through valve 28 to either the barium oxide crystals contained in beds 10 or 12. As shown in the illustration, the air is directed to bed 10. The temperature of the barium oxide-barium peroxide itself is raised and maintained at operating temperatures by internal electrical heating elements 30 of a type shown in application Ser. No. 65,554, filed Aug. 20, 1970, now U.S. Pat. No. 3,687,634, owned by the common assignee of this invention and incorporated herein by reference.

As the dry, hot air under pressure passes through bed 10, the active barium portion of the compound absorbs oxygen from the air and is converted into barium peroxide. The extraction of oxygen produced is based upon a modification by the Brin process principle. This process involves the release of oxygen from barium peroxide in the presence of heated high pressure pure air which is subsequently subjected to vacuum. The chemical reaction for this isothermal reaction may be written as follows:

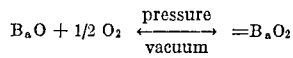

$$\mathrm{B_aO + 1/2\ O_2} \underset{\text{vacuum}}{\overset{\text{pressure}}{\rightleftarrows}} = \mathrm{B_aO_2}$$

However, it should be noted that all the elements of the compounds exist simultaneously with only the percentage varying during the process. During the oxidation cycle with high pressure present, the percentage of $B_aO_2$ increases while the $B_aO$ percentage decreases. During the peroxidation cycle or oxygen production cycle when $B_aO_2 = B_aO + \frac{1}{2}O_2$ in the presence of a vacuum the reverse is experienced. Throughout the process the barium oxide beds are in dynamic equilibrium. The concentration of each constituent, barium oxide-barium peroxide being dependent upon the operation temperature, pressure and cycle frequency.

The reaction of oxygen with barium oxide is a surface phenomenon which is highly dependent upon the surface area available for absorption. It is for this reason that the $B_aO$ crystals in both beds 10 and 12 must have a high surface porosity. The maximum capacity of the barium oxide for oxygen would be to form a mono-nuclear layer of $B_aO$ over the entire surface of each particle. Thus, the greater the number of active centers available for the porous $B_aO$, the greater the amount of $O_2$ absorbed and reacted to form $B_aO_2$.

The rate of the forward reaction, that is from $B_aO + \frac{1}{2}O_2 = B_aO_2$, is practically zero at room temperature but accelerates upon increase of pressure and velocity of the pure air supplied as the temperature rises above 750° C. To effectively utilize the heat exchanger 24 and heating elements 30 or 32 within beds 10 and 12, respectively, heat loss from the operating temperature of 750° C. or 1200–1400° F. within the barium oxide-barium peroxide bed to the environment must be minimized. The activation of either heating elements 30 or 32 must be synchronized with the porting of the pressurized air by valve 28. In addition, the effects of the heating of other system components also must be considered. Since this reaction is exothermic, local heating results and reverse reactions occur which tend to increase the oxygen concentration and thereby drive the reaction in a forward direction. It is for this reason that the external surface covering the heating units is encased in an insulating bed 34 to maintain the heat within the beds without allowing the external surface to be affected by the internal temperature. It is for these reasons that the insulation must be designed of a light-weight material to completely thermally isolate the heater unit containing the beds of barium oxide without an appreciable increase in the external size of the insulating bed 34.

Not all of the warm, dry air which enters bed 10 will be reacted with the barium oxide. The unreacted air and the oxygen depleted air which contains mainly nitrogen will pass out through the heating unit past valve 36 and back to the air-air heat exchanger 24 to warm the incoming air from valve 22. This unreacted air will pass through conduit 42 to valve 38 from whence it will be directed to a moisture control sieve contained in either dehumidification bed 14 or 16 to regenerate the bed by absorbing the excess water vapor. The air ladened with water vapor is then ported by two way valve 40 to the discharge port 20 which is open to the atmosphere. This return conduit 42 has a splitter joint 45 which will allow the purified unreacted air and oxygen depleted air to be ported to a control means 50. Since the unreacted air in conduit 42 is under high pressure, a pressure reducing restriction 44 is needed prior to entering chamber 46 of the control means 50.

At the same time while bed 10 is absorbing oxygen, bed 12 is producing oxygen in the following manner: Two-way valve 48 from bed 12 is simultaneously opened when valves 28 and 36 are opened to bed 10. Valve 48 is connected to an oxygen vacuum pump 52. The reaction air initially in bed 12, upon closure of two way valves 28 and 36, is vented through the pump 52 by way of discharge port 54 to the atmosphere. The pump 52 evacuates air from bed 12 and vents this air to the atmosphere through valve 56 for a predetermined interval of time. After this predetermined interval of time all of the desired residual air will be removed and port 54 closed. During this period of time, the pressure in the bed is maintained at a pressure sufficiently low to cause the oxygen to be given up by the barium peroxide as it reverts back to barium oxide by the following equation:

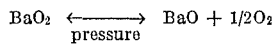

$$BaO_2 \underset{pressure}{\longleftrightarrow} BaO + 1/2 O_2$$

The timing of valve 56 will divert the resulting oxygen flow from the bed of barium oxide-barium peroxide removed by the vacuum pump 52 into a compressor operated by the vacuum pump. The compressor raises the oxygen pressure and transfers it to a storage reservoir 58. Simultaneously operation of valves 22, 28, 38 and 36 automatically cycle the recharging air from one of the beds 10 or 12 to the other is being evacuated to generate oxygen. This twin bed approach gives an efficient continuous operating mode with no loss in time while optimizing the air flow from the pump (not shown) supplying air from the engine area.

The dilution control means 50 is of a type completely described in U.S. Patent 3,509,895 owned by the common assignee of this application and incorporated herein by reference. The unreacted air containing nitrogen in conduit 42 is connected to the air intake chamber 46 while the oxygen from the reservoir 58 is connected to the oxygen inlet 60 of the dilution control means after passing through pressure reducer 62 and a low pressure storage chamber 64. A single outlet 66 is connected to the demand breathing apparatus (not shown) of a recipient. The dilution control means 50 has a valve mechanism 68 which will proportion the amount of oxygen with the air in chamber 46 in a mixing chamber 70 in order to maintain the desired physiological level for the recipient upon suction demand through outlet 66. The proportioning valve means 68 which regulates the flow of air from chamber 46 and oxygen from port 60 has a double faced valve stem 72 which accurately controls the flow to the mixing chamber 70. Through an elevation control 82 the oxygen pressure acts on a dynamic seal 74 to fully open the proportioning valve means 68 to produce a predetermined mixture of air and oxygen on the suction demand of the user above a certain ground level. In case no oxygen pressure is available at inlet 60, valve means 68 is held open and permits the unreacted air and nitrogen to be delivered to the recipient from chamber 46.

When the altitude is increased to a predetermined value, for example between 10,000 and 20,000 ft., the aneroid barometer or elevation control 82 moves to open an exhaust valve means 78 which relieves the oxygen pressure acting on the dynamic seal 74 causing the dilution mechanism to move in the direction which will close the air flow to chamber 46 to correctly proportion a predetermined percentage of oxygen to the recipient at all times. With the further increase in altitudes from 30 to 35,000 ft., the aneroid barometer will completely close the inlet to chamber 46 containing the unreacted air and permit only oxygen from inlet 60 to be imparted to the recipient.

In the event that the user desires to completely override the aneroid barometer control of the dilution control means 50, a lever mechanism 80 will open the oxygen inlet 60 and close the air to chamber 46. Thus, we have a built-in system which will permit the recipient complete control or the oxygen supplying operation. This manual switch-over gives a 100% mode which is an added safety edge during decompression or specific combat missions where the cabin pressure is deliberately decreased.

As shown in FIG. 2, as the percentage of oxygen supplied to a recipient increases the cost to produce this oxygen will follow a curve as shown by line 86. Since a mixture of 40% oxygen with air will suffice to maintain the physiological level of a recipient up to 25,000 ft., if the oxygen production system is operated within the shaded area under the curve, the over-all cost is greatly reduced as compared to supplying 100% oxygen. In addition, by utilizing a barium oxide-barium peroxide system as described in conjunction with FIG. 1, the cost of producing oxygen can be further reduced since the reaction involved is almost completely reversible. Thus, a continual and inexhaustable supply of oxygen is potentially available to a recipient. Further, since the air the recipient is breathing is only enriched, the possibility of becoming a victim of oxygen toxicity is greatly reduced and the possibility of a fire occurring in the system is, likewise, greatly reduced.

We claim:

1. An open loop breathing system for continually separating pressurized environmental air into oxygen and a nitrogen mixture and collecting the oxygen and a first portion of the nitrogen mixture while allowing a second portion of the nitrogen mixture to escape into the environment, said first portion of the nitrogen mixture and the oxygen being proportionally combined to provide a recipient with a breathable fluid capable of maintaining a physiological level in said environment, said system comprising:

filter means located in a supply conduit through which air under pressure from the environment is communicated for removing contaminants from said air;

dehumidification means connected to said filter means for removing a predetermined amount of water vapor from the air under pressure in the conduit;

oxygen extracting means having a housing with an inlet port connected to said supply conduit downstream from said dehumidification means, an outlet port and a vacuum port, said oxygen extraction means having a first chamber and a second chamber connected to the inlet port, first outlet port and vacuum port; said first chamber retaining a first bed of oxide elements and said second chamber retaining a second bed of oxide elements, said first and second beds of oxide elements being adapted to chemically react with air;

first valve means connected to said inlet port and said outlet port for sequentially cycling the air under pressure received by the oxygen extracting means to one of said first and second chambers;

heating means connected to the oxygen extracting means for raising the temperature of the air under pressure and the oxide elements in the first and second beds simultaneously with said cycling to a reaction level, said oxide elements uniting with said air under pressure at said reaction level to form peroxide elements and a nitrogen mixture, said nitrogen mixture passing through said outlet port into a return conduit, said return conduit having splitting means for dividing the nitrogen mixture into a first portion and a second portion, said second portion of the nitrogen mixture being directed through said humidification means where said water vapor is picked up before escaping to the environment;

vacuum means connected to said vacuum port for reducing the pressure in the other of said first and second chambers in sequence with said first valve means for causing said peroxide elements to revert to an oxide element upon the release of oxygen;

compressor means associated with said vacuum means for collecting and transporting the released oxygen from the other of said first and second chambers to a storage reservoir;

mechanical control means responsive to altitude having a housing with a mixing chamber therein, said mixing chamber having an oxygen inlet connected to said reservoir, a nitrogen mixture inlet connected to said return conduit and a demand outlet connected to a breathing regulator; and second valve means located in said mixing chamber and connected to said mechanical control means for regulating the flow of oxygen from said reservoir and said first portion of nitrogen mixture into said mixing chamber to develop said breathable fluid.

2. The breathing system, as recited in claim 1, wherein said mechanical control means further includes:

switching means for automatically opening a valve to said reservoir and closing a valve to said conduit member when the altitude of said control means is above a set sea level elevation.

3. The breathing system, as recited in claim 2, wherein said switching means includes:

a lever member operated by said recipient which can override said switching means thereby permitting only oxygen to be communicated to said outlet port at any elevation.

4. The breathing system, as recited in claim 3, wherein said filter means includes:

a first filter member which removes solid particles from said air; and a second filter member which removes oil and organic vapors to purify said air and remove odors therefrom.

5. The breathing system, as recited in claim 4, wherein said heating means includes:

a first heater member for raising the temperature of said air from said dehumidification means to said reaction level; and a second heater member located in said oxygen extracting means adjacent the bed of oxide elements for maintaining the operating temperature at said reaction level.

6. The breathing system, as recited in claim 5 including:

insulating means encapsulating said heating and oxygen extraction means for minimization of thermal loss to the environment.

References Cited

UNITED STATES PATENTS

| | | | |
|---|---|---|---|
| 2,181,199 | 11/1939 | Otterson | 128—204 |
| 3,509,895 | 5/1970 | Henneman | 137—81 |
| 1,048,812 | 12/1912 | Doherty | 23—221 |
| 3,186,150 | 6/1965 | Zankey | 23—284 X |

JAMES H. TAYMAN, Jr., Primary Examiner

U.S. Cl. X.R.

252—372; 23—260; 98—1.5; 165—2; 128—204, 191; 55—387; 423—217